United States Patent
Hawkins et al.

(10) Patent No.: US 9,399,516 B2
(45) Date of Patent: Jul. 26, 2016

(54) CONVERTIBLE AIRCRAFT GALLEY REFRIGERATOR/CHILLER WITH SIDE DOOR ACCESS

(71) Applicant: B/E Aerospace, Inc., Wellington, FL (US)

(72) Inventors: Aaron B. Hawkins, Seattle, WA (US); Jesse R. Peck, Seattle, WA (US); William J. Godecker, Irvine, CA (US); Victor A. Zankich, Westminster, CA (US)

(73) Assignee: B/E AEROSPACE, INC., Wellington, FL (US)

( * ) Notice: Subject to any disclaimer, the term of this patent is extended or adjusted under 35 U.S.C. 154(b) by 183 days.

(21) Appl. No.: 14/185,163

(22) Filed: Feb. 20, 2014

(65) Prior Publication Data
US 2014/0238064 A1    Aug. 28, 2014

Related U.S. Application Data

(60) Provisional application No. 61/768,037, filed on Feb. 22, 2013.

(51) Int. Cl.

| | |
|---|---|
| *F25D 11/00* | (2006.01) |
| *B64D 11/00* | (2006.01) |
| *B64D 11/04* | (2006.01) |
| *F25D 23/10* | (2006.01) |
| *F25D 23/06* | (2006.01) |
| *F25D 23/04* | (2006.01) |
| *F25D 13/02* | (2006.01) |
| *F25D 11/02* | (2006.01) |
| *F25D 23/02* | (2006.01) |

(52) U.S. Cl.
CPC ............ *B64D 11/0007* (2013.01); *B64D 11/04* (2013.01); *F25D 23/02* (2013.01); *F25D 23/062* (2013.01); *F25D 23/069* (2013.01); *F25D 23/10* (2013.01); *F25D 11/02* (2013.01); *F25D 13/02* (2013.01); *F25D 23/021* (2013.01); *F25D 23/04* (2013.01); *F25D 2400/06* (2013.01); *Y02T 50/46* (2013.01)

(58) Field of Classification Search
CPC .......... F25C 23/04; F25C 23/10; F25C 13/02; F25C 11/02; F25C 23/069; F25C 2400/06; F25C 23/021; B64D 11/0007; B64D 11/04
USPC ...................... 62/440, 258; 244/118.6, 118.2; 312/404, 402, 406, 407
See application file for complete search history.

(56) References Cited

U.S. PATENT DOCUMENTS

| | | | | |
|---|---|---|---|---|
| 2,756,570 | A | * | 7/1956 | Gale ...................... F25D 31/007 221/133 |
| 3,847,460 | A | * | 11/1974 | Weidt ...................... A47B 47/04 206/503 |
| 6,131,399 | A | * | 10/2000 | Hall ...................... G06Q 10/087 221/150 R |

(Continued)

*Primary Examiner* — Marc Norman
*Assistant Examiner* — David Teitelbaum
(74) *Attorney, Agent, or Firm* — Fulwider Patton LLP

(57) ABSTRACT

A refrigeration unit for an aircraft galley comprises a frame establishing a main compartment, and a side window that receives a side access compartment, where a the dividing wall separates the side compartment interior space from a main chilled compartment. A side door mounted to the side access compartment allows access to the side compartment but not the main compartment, allowing segregation of snacks and items accessible to passengers via self-serve from those that are only distributed by flight attendants.

6 Claims, 2 Drawing Sheets

(56) References Cited

U.S. PATENT DOCUMENTS

| | | | |
|---|---|---|---|
| 6,385,990 B1 * | 5/2002 | Lee | A47F 3/0408 62/258 |
| 6,564,569 B1 * | 5/2003 | Havens | A47F 3/0443 62/256 |
| 6,761,332 B1 * | 7/2004 | Bengtsson | B64D 11/04 244/117 R |
| 7,780,114 B2 * | 8/2010 | Doebertin | B64D 11/04 244/118.5 |
| 2010/0140398 A1 * | 6/2010 | Cunningham | A47J 31/005 244/118.5 |

* cited by examiner

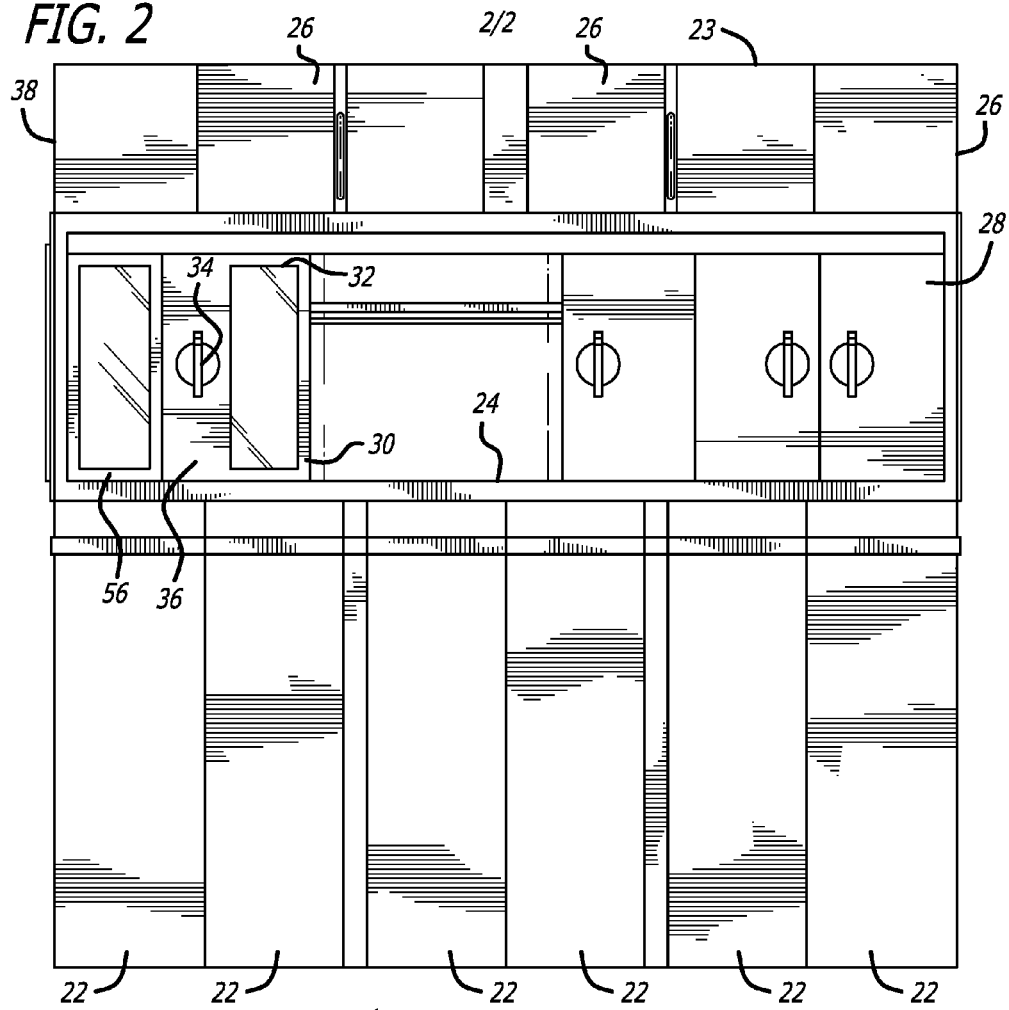
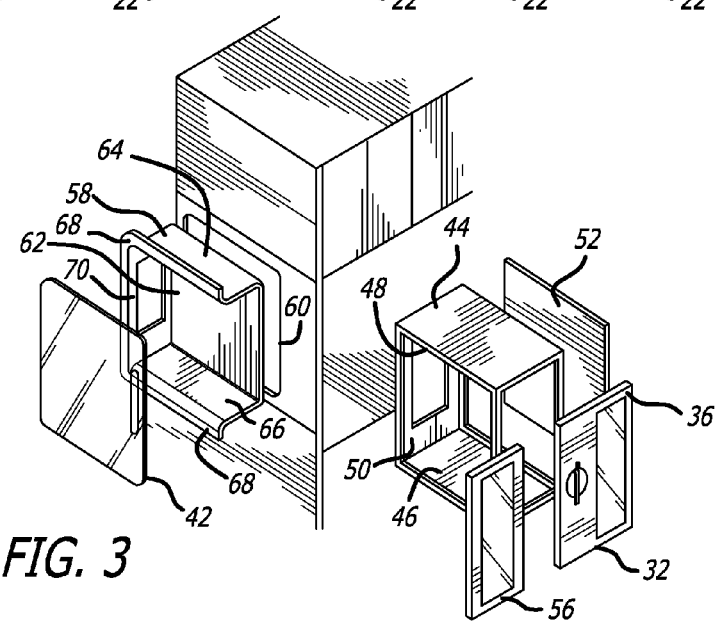

CONVERTIBLE AIRCRAFT GALLEY REFRIGERATOR/CHILLER WITH SIDE DOOR ACCESS

CROSS-REFERENCES TO RELATED APPLICATIONS

This application claims priority from U.S. Application No. 61/768,037, filed Feb. 22, 2013, the contents of which are incorporated by reference in its entirety.

BACKGROUND

Present day commercial aircraft are traditionally configured with a food and beverage preparation area, commonly referred to as a galley, for service of the passengers and crew. The galley incorporates various types of equipment for the storage, preparation, and disposal of food and drink, such as refrigeration units, heaters, ovens, beverage brewing machines, and the like. Flight attendants work within the galley to provide passengers with amenities such as beverages, snacks, and on longer flights, meals. As with all aircraft equipment, today's aircraft galleys strive to be examples of efficiency and conservation of weight and space. Every component of the aircraft galley must abide by these principles, and be both compact and efficient but retain functionality and convenience. All of the equipment must also be arranged in a manner which is both ergonomic and efficient for the allotted space.

It is common among a growing number of commercial airlines to provide a station where passengers can serve themselves certain items, such as a cooler with soft drinks and a shelf for snacks. An example of this system can be incorporated into a double refrigeration unit within the galley that has one side for soft drinks and one side for food storage, or storage of wines and beers. Passengers may help themselves to the soft drinks and snacks, but not the controlled alcoholic products. One issue with this system is that it requires that passengers be granted access to the galley, which is problematic to the flight attendants. Having passengers in the galley presents both safety concerns as there are equipment such as boilers and other apparatus that could burn or injure a passenger, and security concerns where passengers can pilfer restricted items in the galley when no one is looking.

To eliminate the requirement that passengers be allowed in the galley, many airlines have created a cooler that is outside the galley, such as in the walkway aisle adjacent the galley. The cooler can be loaded with soft drinks and snacks, and the passengers can retrieve them without entering the galley or disturbing the flight attendants. However, such systems either require their own chilling system, or require ducting from a main chilling system to the separate auxiliary cooler. Both of these solutions add weight to the aircraft, efficiency deficits due to losses in the ducting, and configuration problems connecting the cooler to the main chilling system.

While the dual refrigeration units provide economy in that a separate refrigeration unit is not required for the passengers' self service station, the security issue that arises when passengers have access to the main refrigeration unit (where non-gratis products such as wines and beers are also stored) makes this an unsatisfactory solution. Passengers can reach into the refrigeration unit and pilfer some products that are reserved for other passengers or for which a separate charge is associated. Currently there is no method by which the economy of a single refrigeration unit is provided that includes a passenger self-service window, but limits the access of the passengers within the refrigerator unit to a selected area where only complementary products are within reach.

SUMMARY OF THE INVENTION

The present invention is a refrigeration unit for an aircraft galley that includes a side access window/door for allowing passengers to select and self-serve certain products such as soft drinks, but where the refrigeration unit is constructed so as to limit the access of the passengers to a designated portion of the chiller and does not require the passengers to enter the galley. The side window is accessed from outside the galley, preferably in the adjacent common walkway or aisle, so that passengers do not need to enter the galley to retrieve a complimentary drink or the like. An advantage of the present invention is that it can be retrofitted from existing aircraft chillers, such as for example the 600 Series wine chillers available from BE Aerospace Inc. of Wellington, Fla. The front loaded refrigeration unit has at least one front door that is within the galley where flight attendants can fill the unit with drinks and snacks, and also use the refrigeration unit in a separate compartment for restricted beverages such as beers and wines. Passengers, via the side access door, may retrieve the complimentary items stored in the designated compartment, but cannot gain access to the restricted items located in the separate compartment. However, both compartments are cooled by the same cooling unit and no additional ducting is required to chill both compartments.

The refrigeration unit of the present invention includes a frame with a removable panel on one side that can be moved to the other side as required by the aircraft's configuration and its location within the galley. The opposite side of the frame is open to receive a side compartment module that mounts within the side wall of the galley. The side compartment module is preferably open in either the back or the top to allow chilled air to circulate, but provides a barrier to the restricted compartment so that passengers cannot reach though to access the beers, wines, etc. The refrigeration unit is thus divided into two compartments that can both be loaded though the front doors of the refrigeration unit, but allows access through a side door outside of the galley to one of the two compartments.

Since both compartments use the same cooling equipment, there is no additional ducting or apparatus needed to cool the products in the side compartment. The elimination of the need for a second chiller and/or ducting saves both the cost of the chiller and the weight associated with a second refrigeration unit and additional components. The side compartment, which is accessible in the aisle outside of the galley, can be used to store complimentary beverages and snacks that is accessible by passengers, reducing the burden on the flight attendants.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 2 is a front view of the galley chiller; and

FIG. 3 is an exploded view of the galley chiller of FIG. 1.

DETAILED DESCRIPTION OF THE PREFERRED EMBODIMENTS

Figure 1:
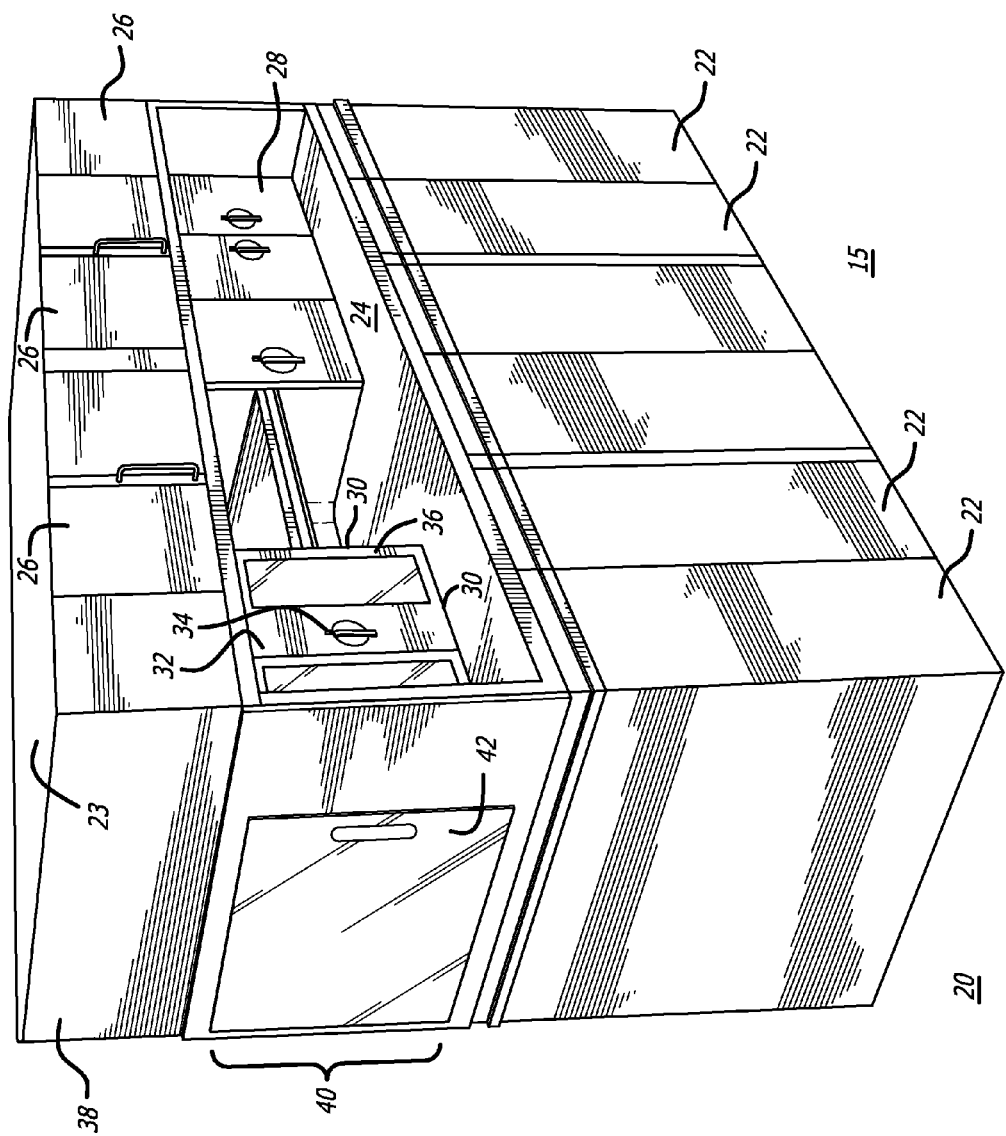
FIG. 1 is an elevated perspective view of the galley chiller of the present invention.

FIG. 1 illustrates an example of a convertible aircraft galley refrigerator/chiller with a side door access that allows passengers to retrieve complimentary products from the side entrance without entering the galley. A galley monument 23 is shown at a perspective view to illustrate both the entrance to the galley area 15 and the aisle/walkway 20 used by the passengers. The monument 23 includes a number of features, including bays 22 for storing beverage carts used to serve the passengers, a counter 24 that can be used to prepare beverages and meals, storage cabinets 26 to house mugs, supplies, cleaning supplies, or other emergency equipment, and ovens 28 for heating meals. It is understood that galleys can include other features known to those of ordinary skill in the art, the recitation of which is omitted herein for brevity.

At the corner of the monument 23 is a refrigeration unit 30 having a front panel 32 and a handle 34 used to open a door 36. On the side of the monument 23 is an aisle wall 38 that is outside of the galley area 15, and includes a self-serve station 40 that passengers can access. The self-serve station 40 includes a door 42, which may be a sliding panel or a pivoting door that accesses the interior of the refrigeration unit 30. Items such as cans of soda or bottles of water can be loaded into the refrigeration unit 30 by flight attendants in the galley area 15 via door 36, and removed using the side door 42 in the self-serve station 40. However, as explained below, passengers do not have access to the entirety of the refrigeration unit's interior, but rather only a selected portion of the interior can be accessed by the passengers.

FIG. 3 shows how a supplemental or auxiliary compartment can be formed in the refrigeration unit 30 that limits access through the side door 42. A frame 44 for the refrigeration unit 30 includes a floor 46, a ceiling 48, a rear wall 50, and a removable first side wall 52. The first side wall 52 can be placed on either the right side or the left side of the frame 44, depending upon the arrangement of the galley and the placement of the refrigeration unit 30. Opposite the removable first side wall 52 is an open side window that is aligned with the passenger self-serve station 40 in the monument wall 38. The door 36 with handle 34 on the front of the refrigeration unit includes a seal to prevent chilled air from escaping, and a second door 56 may be used to access the auxiliary compartment. Placed within the open side window is a side access compartment 58 sized to fit into a cut-out 60 in the wall 38. The side access compartment 58 is tub-shaped wherein the bottom of the tub establishes a dividing wall 62 inside the interior of the refrigeration unit 30. The top 64 and bottom 66 panels cooperating with the dividing wall 62 to define a side compartment interior space, the dividing wall 62 separating the side compartment interior space from a main chilled compartment.

To maintain the side access compartment 58 within the cut-out 60, a transverse retaining lip 68 spaced from the dividing wall 62 bears against the outside surface of the wall 38, and can be mounted to the wall using any number of ways, including fasteners, adhesives, and the like. The transverse retain lip 68 extends from the top and bottom panels 64, 66 (and preferably a rear panel 70) to secure the side access compartment to the fixed galley monument wall 38. The side compartment is accessed via a side door 42, which can also be any number of types of doors, from sliding to hinged, to a pull-out panel. In a first preferred embodiment, the door 42 slides in grooves within the self-serve station to easily open and close the unit. The side door 42 provides access to the side compartment, but only up to the dividing wall 62. Other items stored in the main compartment of the refrigeration unit are inaccessible though the side door 42, ensuring that costlier items cannot be taken through the self-serve station by passengers. The configuration allows drinks and snacks to be placed in the refrigeration unit 30 via the first and second front doors 36, 56 in both the main chilled compartment and the side access compartment, and wherein access to the main chilled compartment is foreclosed via the side door.

In a first preferred embodiment, the rear panel 70 is open (See FIG. 3) to allow circulation of the chilled air from the main compartment to enter the side compartment, along the opening can also be established in the top panel 64, although to prevent passengers from reaching over the dividing wall 62 some mesh or grid is preferred over the opening.

The side access compartment 58 is preferably formed from a single sheet of metal or polymer, stamped into the desired shape, and inserted into the cavity in the frame. Aluminum could be used due to its corrosion resistant properties and easy of shaping, or other materials could be used equally as well, as long as the material possesses the necessary strength after shaping to not deform or corrode once inserted into the chilled environment of the refrigeration unit 30.

The refrigeration unit can include locks on either the front doors 36, 56 or the side door 42 to prevent entry without a key where greater control is required over the contents of the refrigeration unit.

The benefit of the present invention is the cost and weight savings of using the primary chiller to cool a second compartment, which is more efficient and saves costs and weight. This also saves space, as the volume that would be needed to house a second refrigeration system for the second chiller can be used to store beverages, food, wine, beer, or other products served on the flight.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A refrigeration unit for an aircraft galley, comprising:
   a frame defined by a floor, a ceiling, a front surface comprising first and second front doors, a rear wall, a removable first side wall, and an open side window opposed said removable first side wall;
   a side access compartment received in the open side window of the frame, the side access compartment comprising a dividing wall, top and bottom panels cooperating with the dividing wall to define a side compartment interior space, the dividing wall separating the side compartment interior space from a main chilled compartment;
   a transverse retaining lip spaced from the dividing wall and extending from the top and bottom panels to mount the side access compartment to a fixed galley wall; and
   a side door mounted to the side access compartment for gaining access to the side compartment interior space;
   wherein the first and second front doors provide access to an interior of the main chilled compartment and the side compartment interior space; and wherein the side door provides access only to the side compartment interior space.

2. The refrigeration unit of claim 1, wherein the side access compartment includes a rear panel, and wherein the transverse retaining lip extends continuously from the top panel to the rear panel to the bottom panel.

3. The refrigeration unit of claim 2, wherein the rear panel includes an opening for communicating chilled air into the side access compartment from the main chilled compartment.

4. The refrigeration unit of claim 1, wherein the fixed galley wall is disposed between the transverse retaining lip and the frame.

5. The refrigeration unit of claim 1, wherein the side access compartment is formed from a single sheet, shaped to establish the side compartment interior space.

6. The refrigeration unit of claim 1, further comprising a window enclosing the side access compartment, wherein the side door slides with a groove on said open side window.

\* \* \* \* \*